US008719019B2

(12) United States Patent
Do et al.

(10) Patent No.: US 8,719,019 B2
(45) Date of Patent: May 6, 2014

(54) SPEAKER IDENTIFICATION

(75) Inventors: Hoang T. Do, San Francisco, CA (US);
Ivan J. Tashev, Kirkland, WA (US);
Alejandro Acero, Bellevue, WA (US);
Jason S. Flaks, Redmond, WA (US);
Robert N. Heitkamp, Sammamish, WA
(US); Molly R. Suver, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 549 days.

(21) Appl. No.: 13/093,680

(22) Filed: Apr. 25, 2011

(65) Prior Publication Data
US 2012/0271632 A1 Oct. 25, 2012

(51) Int. Cl.
*G01L 15/00* (2006.01)

(52) U.S. Cl.
USPC ........ 704/246; 704/206; 704/207; 704/200.1; 704/250; 704/208; 704/209; 704/232; 434/185

(58) Field of Classification Search
CPC ....................................................... G10L 17/00
USPC ......................................................... 704/246
See application file for complete search history.

(56) References Cited

U.S. PATENT DOCUMENTS

| | | | | |
|---|---|---|---|---|
| 4,914,702 A * | 4/1990 | Taguchi | ........................ | 704/222 |
| 4,982,433 A * | 1/1991 | Yajima et al. | ................. | 704/208 |
| 5,097,509 A * | 3/1992 | Lennig | .......................... | 704/240 |
| 5,381,512 A * | 1/1995 | Holton et al. | .............. | 704/200.1 |
| 5,461,697 A * | 10/1995 | Nishimura et al. | ........... | 704/232 |
| 5,787,387 A * | 7/1998 | Aguilar | .......................... | 704/208 |
| 5,930,753 A * | 7/1999 | Potamianos et al. | ........ | 704/256.2 |
| 6,173,260 B1 * | 1/2001 | Slaney | ........................... | 704/250 |
| 6,182,036 B1 * | 1/2001 | Poppert | ......................... | 704/243 |
| 6,292,775 B1 * | 9/2001 | Holmes | ......................... | 704/209 |
| 6,292,776 B1 * | 9/2001 | Chengalvarayan | ........... | 704/219 |
| 6,389,392 B1 * | 5/2002 | Pawlewski et al. | ........... | 704/241 |
| 6,922,668 B1 * | 7/2005 | Downey | ........................ | 704/246 |
| 6,934,364 B1 * | 8/2005 | Ho | ................................... | 379/21 |
| 6,993,483 B1 * | 1/2006 | Milner | .......................... | 704/236 |

(Continued)

FOREIGN PATENT DOCUMENTS

WO    9737345 A1    10/1997

OTHER PUBLICATIONS

T. Ganchev, N. Fakotakis, G. Kokkinakis: Comparative Evaluation of Various MFCC Implementations on the Speaker Verification Task, Proc. of the SPECOM-2005, Oct. 17-19, 2005. Patras, Greece. vol. 1, pp. 191-194.*

(Continued)

*Primary Examiner* — Pierre-Louis Desir
*Assistant Examiner* — Fariba Sirjani
(74) *Attorney, Agent, or Firm* — Judy Yee; Micky Minhas; Wolfe-SBMC

(57) ABSTRACT

Speaker identification techniques are described. In one or more implementations, sample data is received at a computing device of one or more user utterances captured using a microphone. The sample data is processed by the computing device to identify a speaker of the one or more user utterances. The processing involving use of a feature set that includes features obtained using a filterbank having filters that space linearly at higher frequencies and logarithmically at lower frequencies, respectively, features that model the speaker's vocal tract transfer function, and features that indicate a vibration rate of vocal folds of the speaker of the sample data.

20 Claims, 6 Drawing Sheets

(56) References Cited

U.S. PATENT DOCUMENTS

| | | | | |
|---|---|---|---|---|
| 8,140,331 | B2* | 3/2012 | Lou | 704/243 |
| 8,396,705 | B2* | 3/2013 | Bilobrov | 704/217 |
| 8,447,614 | B2* | 5/2013 | Capman et al. | 704/273 |
| 2001/0021904 | A1* | 9/2001 | Plumpe | 704/209 |
| 2002/0029145 | A1* | 3/2002 | Miranda | 704/258 |
| 2002/0065649 | A1* | 5/2002 | Kim | 704/219 |
| 2002/0150871 | A1* | 10/2002 | Blass et al. | 434/185 |
| 2003/0236663 | A1* | 12/2003 | Dimitrova et al. | 704/245 |
| 2004/0059570 | A1* | 3/2004 | Mochinaga et al. | 704/205 |
| 2004/0158465 | A1* | 8/2004 | Rees | 704/233 |
| 2007/0185718 | A1* | 8/2007 | Di Mambro et al. | 704/273 |
| 2008/0046241 | A1* | 2/2008 | Osburn et al. | 704/250 |
| 2008/0300875 | A1* | 12/2008 | Yao et al. | 704/236 |
| 2011/0276323 | A1* | 11/2011 | Seyfetdinov | 704/207 |
| 2012/0215546 | A1* | 8/2012 | Biswas et al. | 704/500 |
| 2013/0024016 | A1* | 1/2013 | Bhat | 700/94 |
| 2013/0197913 | A1* | 8/2013 | Bilobrov | 704/270 |

OTHER PUBLICATIONS

Md. Rashidul Hasan, Mustafa Jamil, Md. Golam Rabbani Md. Saifur Rahman, "Speaker Identification Using MEL Frequency Cepstral Coefficients" 3rd International Conference on Electrical & Computer Engineering ICECE 2004, Dec. 28-30, 2004, Dhaka, Bangladesh.*

Ahmadi, S. et al., "Cepstrum-Based Pitch Detection Using a New Statistical V/UV Classification Algorithm", *IEEE Transactions on Speech and Audio Processing*, vol. 7, No. 3, retrieved from <<http://www.ece.uvic.ca/~ece499/2004b/group11/publications/00759042.pdf>> on Apr. 8, 2011,(May 1999),pp. 333-338.

Atal, B. S., et al., "Speech Analysis and Synthesis by Linear Prediction of Speech Wave", *Journal of the Acoustical Society of America*, vol. 50, retrieved from <<http://courses.cs.tamu.edu/rgutier/cpsc689_s07/atalHanauer1971lpc.pdf>> on Apr. 8, 2011,(1971),pp. 637-655.

Bimbot, et al., "A Tutorial on Text-Independent Speaker Verification", *EURASIP Journal on Applied Signal Processing*, vol. 4, retrieved from <<http://www.cs.toronto.edu/~gpenn/csc2518/bimbot-etal04.pdf>> on Apr. 8, 2011,(2004),pp. 430-451.

Compton, A. J., "Effects of Filtering and Vocal Duration upon the Identification of Speakers, Aurally", *Journal of the Acoustical Society of America*, vol. 35, (1963),pp. 1748-1752.

Davis, Steven B., et al., "Comparison of Parametric Representations for Monosyllabic Word Recognition in Continuously Spoken Sentences", *IEEE Transactions on Acoustics, Speech, and Signal Processing*, vol. ASSP-28, No. 4,retrieved from <<http://home.iitk.ac.in/~rhegde/ee627_2010/mermelmfcc.pdf>> on Apr. 8, 2011.,(Aug. 1980),pp. 357-366.

Hayakawa, S. et al., "Text-Dependent Speaker Recognition Using the Information in the Higher Frequency", *Acoustics, Speech, and Signal Processing, 1994. ICASSP-94., 1994 IEEE International Conference on* Apr. 19-22, 1994, *Australia*, (Apr. 19, 1994),pp. 137-140.

Lavner, Y. et al., "The Effects of Acoustic Modifications on the Identification of Familiar Voices Speaking Isolated Vowels", *Speech Communication*, vol. 30, retrieved from <<http://spl.telhai.ac.il/speech/pub/Lavner_Gath_Rosenhouse.pdf>> on Apr. 8, 2011,(2000),pp. 9-26.

Lei, H. et al., "Mel, Linear, and Antimel Frequency Cepstral Coefficients in Broad Phonetic Regions for Telephone Speaker Recognition", *Proceedings of Interspeech, Brighton, UK*, retrieved from <<http://www.icsi.berkeley.edu/pubs/speech/lei_lopez_melantimel.pdf>> on Apr. 8, 2011,(2009),pp. 2323-2326.

Lu, X. et al., "Physiological Feature Extraction for Text-Independent Speaker Identification Using Non-Uniform Subband Processing", *Acoustics, Speech and Signal Processing, 2007. ICASSP 2007. IEEE International Conference on* Apr. 15-20, 2007, (Apr. 15, 2007),pp. 461-464.

Sturim, et al., "Speaker Adaptive Cohort Selection for Tnorm in Text-Independent Speaker Verification", *Acoustics, Speech, and Signal Processing, 2005. Proceedings. (ICASSP '05). IEEE International Conference. Philadelphia, PA*, vol. 1., (Mar. 2005),pp. 741-744.

Aida-Zade, et al., "Investigation of Combined use of MFCC and LPC Features in Speech Recognition Systems", Retrieved at<<http://www.waset.org/journals/waset/v19/v19-15.pdf>>, World Academy of Science, Engineering and Technology 19 2006, pp. 74-80.

Harrag, et al., "LDA Combination of Pitch and MFCC Features in Speaker Recognition", Retrieved at<<http://ieeexplore.ieee.org/stamp/stamp.jsp?tp=&arnumber=1590163>>, IEEE Indicon, Dec. 11-13, 2005, pp. 237-240.

Yutai, et al., "Speaker Recognition Based on Dynamic MFCC Parameters",Retrieved at<<http://ieeexplore.ieee.org/stamp/stamp.jsp?arnumber=05054638>>, Apr. 11-12, 2009, pp. 4.

Stadelmann, et al., "WebVoice: A Toolkit for Perceptual Insights into Speech Processing", Retrieved at<<http://ieeexplore.ieee.org/stamp/stamp.jsp?tp=&arnumber=5303897>>, Oct. 17-19, 2009, pp. 5.

Wang, et al., "Speaker Identification by combining MFCC and Phase Information in Noisy Environments",Retrieved at<<http://www.imt.liu.se/mi_old/Intern/Onlineproceedings/ICASSP_2010/pdfs/0004502.pdf>>,2010, pp. 4502-4505.

Markov, et al., "Integrating Pitch and LPC-Residual Information with LPC-Cepstrum for Text-Independent Speaker Recognition", Retrieved at<<http://www.slp.ics.tut.ac.jp/shiryou/number-2/E1999-39.pdf>>, 1999, pp. 281-291.

Chakroborty, et al., "Improved Text-Independent Speaker Identification using Fused MFCC & IMFCC Feature Sets based on Gaussian Filter", Retrieved at<<http://www.waset.org/journals/ijice/v5/v5-1-2.pdf>>, International Journal of Information and Communication Engineering, 2009, pp. 11- 19.

* cited by examiner

SPEAKER IDENTIFICATION

BACKGROUND

Speech recognition techniques have been developed to recognize "what is being said" in a user utterance. For example, the speaker recognition techniques may be utilized to interact with an automated call center, input text, initiate commands, and so on. However, these techniques were typically developed for use regardless of what user provided the utterance. Accordingly, traditional speech recognition techniques were ill suited to identify a speaker, in other words, to determine "who" spoke.

SUMMARY

Speaker identification techniques are described. In one or more implementations, sample data is received at a computing device of one or more user utterances captured using a microphone. The sample data is processed by the computing device to identify a speaker of the one or more user utterances. The processing involving use of a feature set that includes features obtained using a filterbank having filters that space linearly at higher frequencies and logarithmically at lower frequencies, respectively, features that model the speaker's vocal tract transfer function, and features that indicate a vibration rate of vocal folds of the speaker of the sample data.

In one or more implementations, a feature set computed from an audio signal is obtained that uses coefficients obtained from a Reversed Mel-Frequency Cepstral Coefficients (RMFCC) filterbank, a set of Linear Predictive Coding (LPC) coefficients, and pitch. The obtained feature set is compared with one or more other feature sets to identify a speaker in the audio signal.

In one or more implementations, an apparatus includes a microphone and a speaker identification module configured to identify a speaker from an audio signal obtained from the microphone. The speaker identification module is configured to perform the identification by modeling a vocal tract and vocal cords of the speaker by processing the audio signal and comparing the model processed from the audio signal with one or more other models that correspond to an identity to determine which identity corresponds to the speaker. The identity is output to a game that is executed on hardware of the apparatus.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
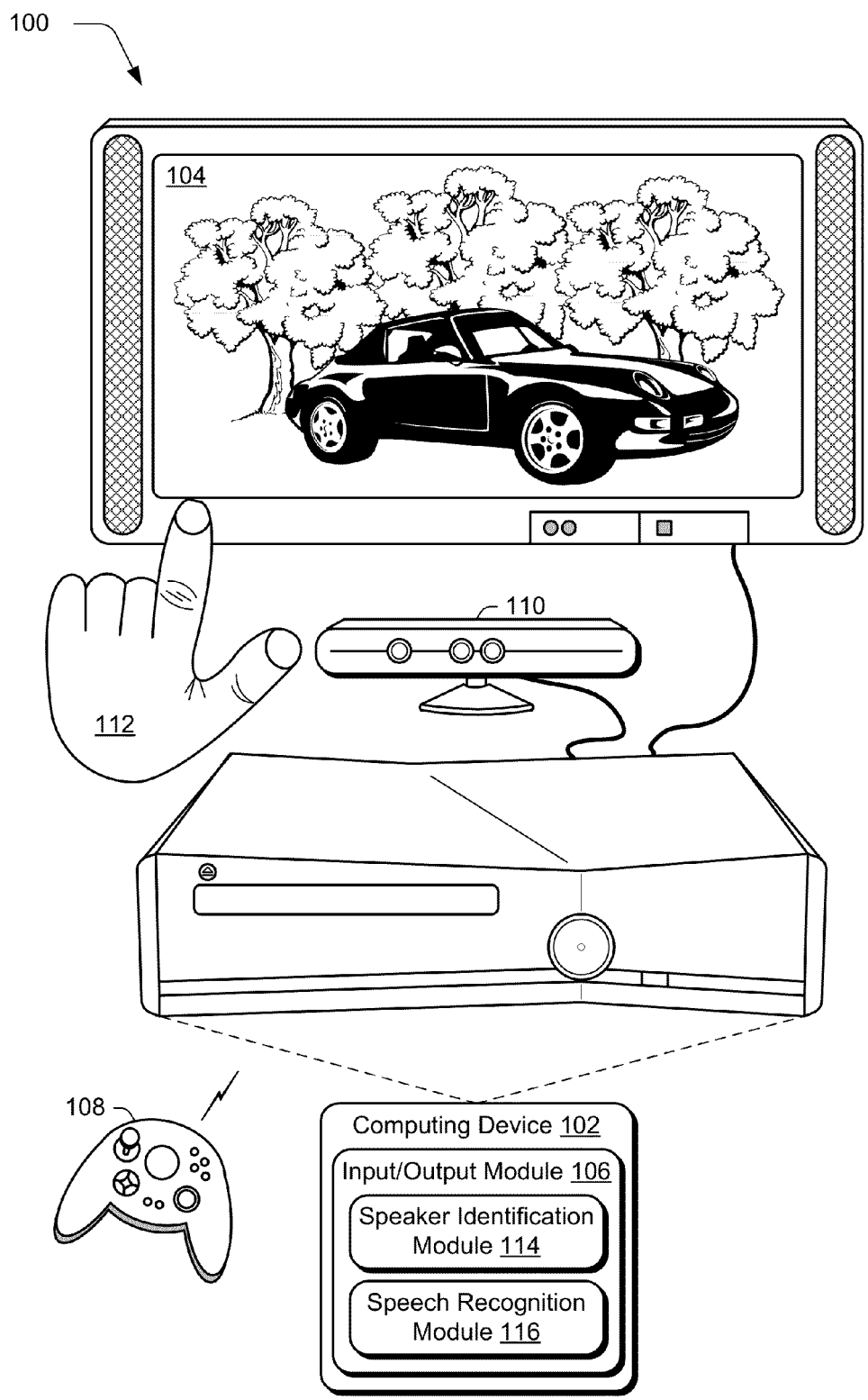
FIG. 1 is an illustration of an environment in an example implementation that is operable to employ speaker identification techniques described herein.

Input techniques that may be utilized to interact with a computing device have evolved from input techniques typically implemented using a keyboard and mouse to interaction with a graphical user interfaces and speech. For example, a computing device may capture user utterances using a microphone and process these utterances to identify "what was said" by a speaker. These user utterances may also be processed to determine "who spoke" the utterance. Thus, speech recognition may be used to input text, initiate commands, and so on and speaker identification may determine "who" provided the user utterances. However, traditional techniques that were utilized to process speech were processor intensive and could be ill suited for use in many real world environments, such as in a noisy gaming environment or at relatively far distances compared to those typically employed for conventional speech recognition techniques.

Techniques are described herein which may be used to identify a speaker. In one or more implementations, the speaker identification techniques are used to identify features in user utterances. The features identified in the user utterances may then be compared with features obtained from samples from one or more users to determine which of the users likely provided the utterance. A variety of different speaker identification techniques may be employed. Example techniques described herein include use of coefficients obtained from a reversed Mel Frequency Cepstral Coefficients (MFCC) filter bank, a set of linear prediction coding (LPC) coefficients, and pitch (e.g., F0) as a feature set. This feature set may be used to model a speaker's vocal tract transfer function and the vocal cords, thus allowing a better identification. Additionally, these techniques may be combined to maximize a recognition rate for identifying a speaker.

Speaker identification may be leveraged for a variety of purposes. For example, speaker identification may be used to login to a computing device by identifying "who" provided a user utterance. Additionally, speaker identification may be used to increase efficiency of speech recognition by first determining who provided an utterance and then using data associated with the identified user to determine what was said in the user utterance. In this way, the amount of processing involved in the speech recognition may be reduced. Further discussion of speaker identification techniques may be found in relation to the following sections.

In the following discussion, an example environment is first described that is operable to employ the speaker identification techniques described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

FIG. 1 is an illustration of an environment 100 in an example implementation that is operable to employ speaker identification techniques. The illustrated environment 100 includes an example of a computing device 102 that is illustrated as a game console that is communicatively coupled to a display device as typically found in a home environment. However, the computing device 102 may be configured in a variety of other ways. For example, the computing device 102 may be configured as a traditional computer (e.g., a desktop personal computer, laptop computer, and so on), a mobile station, an entertainment appliance, a wireless phone, a tablet, a netbook, and so forth as further described in relation to FIGS. 5 and 6. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is illustrated as including an input/output module 106. The input/output module 106 is representative of functionality relating to recognition of inputs and/or provision of outputs by the computing device 102. For example, the input/output module 106 may be configured to receive inputs from a keyboard, mouse, to identify gestures and cause operations to be performed that correspond to the gestures, process speech inputs, and so on. The inputs may be detected by the input/output module 106 in a variety of different ways.

The input/output module 106 may be configured to receive one or more inputs via touch interaction with a hardware device, such as a controller 108 as illustrated. Touch interaction may involve pressing a button, moving a joystick, movement across a track pad, use of a touch screen of the display device 104 (e.g., detection of a finger of a user's hand or a stylus), and so on. Recognition of the touch inputs may be leveraged by the input/output module 106 to interact with a user interface output by the computing device 102, such as to interact with a game, an application, browse the internet, change one or more settings of the computing device 102, and so forth. A variety of other hardware devices are also contemplated that involve touch interaction with the device. Examples of such hardware devices include a cursor control device (e.g., a mouse), a remote control (e.g. a television remote control), a mobile communication device (e.g., a wireless phone configured to control one or more operations of the computing device 102), and other devices that involve touch on the part of a user or object.

The input/output module 106 may also be configured to provide a natural user interface (NUI) that may recognize interactions that may not involve touch. For example, the computing device 102 may include a NUI input device 110. The NUI input device 110 may be configured in a variety of ways to detect inputs without having a user touch a particular device, such as to recognize audio inputs through use of a microphone.

For example, the NUI input device 110 may be configured to recognize gestures, presented objects, images, and so on through use of a camera. The camera, for instance, may be configured to include multiple lenses so that different perspectives may be captured and thus determine depth. The different perspectives, for instance, may be used to determine a relative distance from the NUI input device 110 and thus a change in the relative distance. The different perspectives may be leveraged by the computing device 102 as depth perception. The images may also be leveraged by the input/output module 106 to provide a variety of other functionality, such as techniques to identify particular users (e.g., through facial recognition), objects, and so on.

The input-output module 106 may leverage the NUI input device 110 to perform skeletal mapping along with feature extraction of particular points of a human body (e.g., 48 skeletal points) to track one or more users (e.g., four users simultaneously) to perform motion analysis. For instance, the NUI input device 110 may capture images that are analyzed by the input/output module 106 to recognize one or more motions made by a user, including what body part is used to make the motion as well as which user made the motion. An example is illustrated through recognition of positioning and movement of one or more fingers of a user's hand 112 and/or movement of the user's hand 112 as a whole. The motions may be identified as gestures by the input/output module 106 to initiate a corresponding operation.

In another example, the input/output module 106 may be configured to perform operations relating to user speech. This is illustrated in FIG. 1 through inclusion of a speaker identification module 114 and a speech recognition module 116 as part of the computing device 102. The speaker identification module 114 is representative of functionality of the computing device 102 to correlate a user utterance with a particular user and thus identify "who" provided the user utterance. As previously stated, this identification may be used for a variety of purposes, such as to login a user without further processing of the user utterance. For example, this technique may be used to determine "who" spoke the utterance without determining "what was said" in the utterance. Further, the identification techniques may also leverage additional input data, such as face recognition, skeleton proportions, and so on as described above to disambiguate unclear results. Thus, speaker identification may be verified through use of image data captured from a camera of a physical environment of the computing device to verify the identification of the speaker.

The identification may also be used to improve efficiency in performing speech recognition by the speech recognition module 116. For example, by identifying a particular speaker, subsequent processing of a user utterance may leverage previous samples and other data that pertains to that speaker. In this way, the amount of processing performed by the speech recognition module 116 may be lessened and thus performed in a time-efficient manner. Further discussion of processing performed by the speaker identification module 114 may be found in relation to FIG. 2.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the speaker identification techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
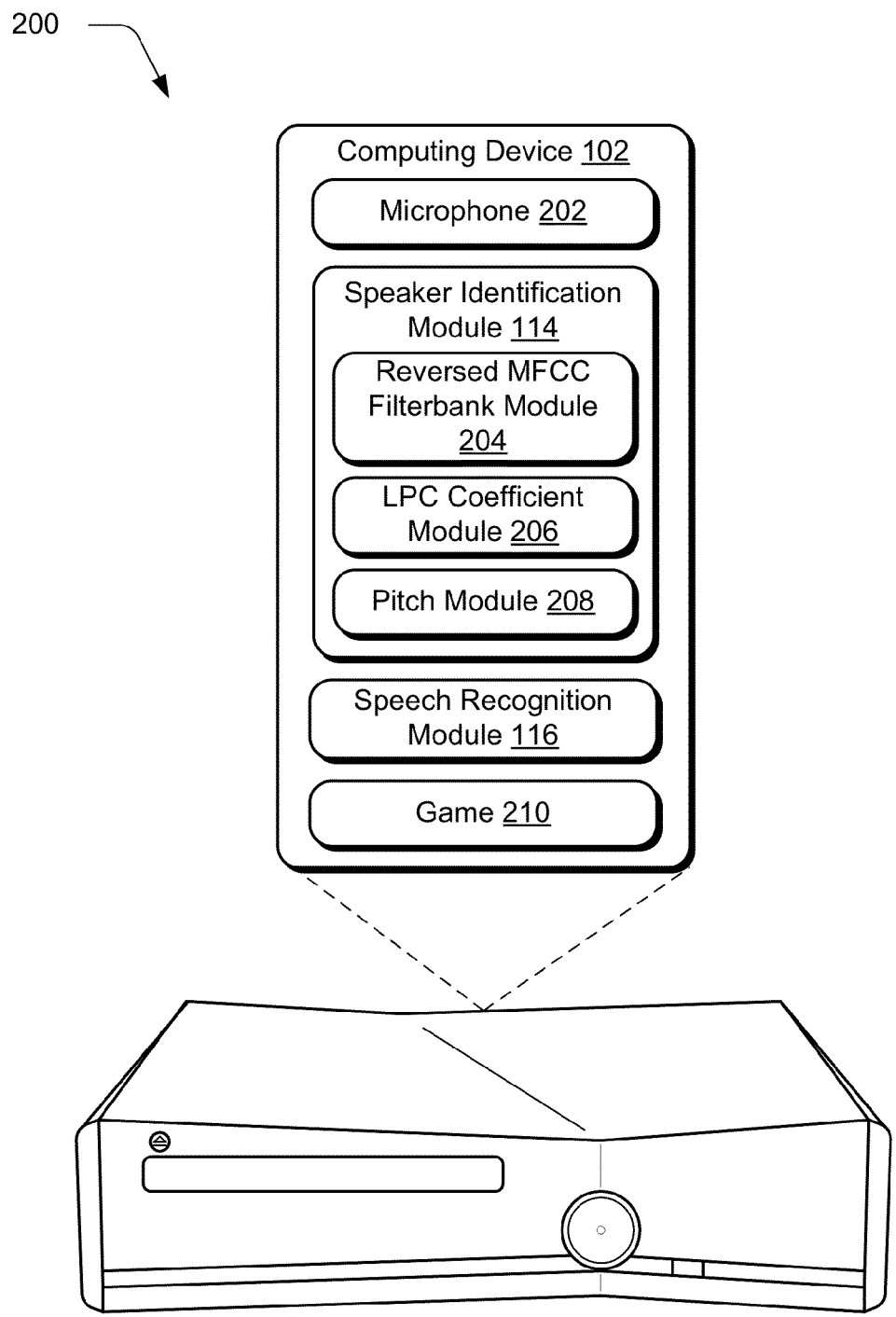
FIG. 2 illustrates an example system showing a speaker identification module of FIG. 1 in greater detail as configured to identify a speaker using a plurality of different algorithms.

FIG. 2 depicts a system 200 in an example implementation in which the speaker identification module 114 is shown in greater detail as employing techniques to identify a speaker from a user utterance. As previously described, speak identification may be used for a variety of purposes, such as for game consoles for controller-free gaming and hands-free sound-capturing to provide a natural and interactive environment. Speaker identification may also be used as one of the cues for game player identification systems, apart from the applications found in conventional scenarios using recorded telephone speech.

In a gaming scenario, for instance, each player may register with the gaming system by speaking one or more sentences to be used as training data. In the game stage, for instance, a player typically speaks briefly for a few seconds to provide test data. Using the test data, a score is built by the speaker identification module 114 against each model built from the training data. Based on the scores, the tested player may be identified as one of the registered players or as an impostor.

This identification process can be used in many cases, such as to prevent unauthorized players to log in or to participate in the game. In another example, when the players speak simultaneously in a trivia game, the gaming system may be able to pick the player whose answer is correct. In such case, the system may separate the players' voices and process the voices using the speaker identification module 114 to tell "who is who." The answers may then be processed by the speech recognition module 116 to determine which player provided the correct answer.

In non-gaming scenarios, a speaker population is often quite large, e.g., may include over five hundred speakers. However, the amount of training data and test data is also often quite abundant, e.g., can involve a few minutes of sample data.

On the other hand, speaker identification for gaming 210 scenarios generally operates on a relatively small speaker population (e.g., typically fewer than twenty users) and has limited training data (e.g., less than 10 seconds), relatively short test data (e.g. two to five second test utterances), and involves almost real-time processing. In addition, the computational resources of the gaming system may be shared by many tasks, such as sound source localization, beam forming, noise reduction, speech recognition, and video processing. Further, speech data captured by a microphone array may also raise the problem of reverberation and background noise from the gaming environment as opposed to non-array microphones, such as those employed by user headsets, and so on. These are challenges that are not typically found in the conventional scenarios using telephone speech, speech involved in an office environment, and so on.

Using the techniques described herein, however, a speaker identification module 114 may be employed in conventional scenarios as well as in gaming scenarios. For example, the speaker identification module 114 may employ techniques to arrive at a feature set that models a speaker vocal tract transfer function and vocal cords and thus allows a better identification of a speaker. Examples of these techniques as illustrated in the system 200 of FIG. 2 as a reversed Mel-Frequency Cepstral Coefficients (RMFCC) module 204, a Linear Predictive Coding (LPC) Coefficient Module 206, and a pitch module 208, the functioning of which are described as follows.

Reversed Mel-Frequency Cepstral Coefficients (RMFCC) Module 204

Traditional Mel-Frequency Cepstral Coefficients (MFCC) involve a representation defined as the real cepstrum of a windowed short-time signal derived from a Fast Fourier Transform (FFT) of that signal. This real cepstrum utilizes a nonlinear frequency scale (e.g., Mel-scale), which approximates behavior of a human auditory system. The Mel-scale warping is done by using a Mel-filterbank, where the filters space linearly at low frequencies (e.g., $f \leq f_{cutoff} = 700$ Hz) and logarithmically at high frequencies (700 Hz to the Nyquist frequency) as shown in the following expression:

$$f_{Mel} = 2595 \log_{10}\left(1 + \frac{f_{fourier}}{700}\right).$$

The design of this filterbank benefits speech recognition tasks, where the first and second formant frequencies (e.g., F1 & F2) carry information that is of higher importance in what is being said. This filterbank has a relatively high resolution for lower formant frequencies and a relatively low resolution in the upper frequency range. The implicit effect of the Mel-filterbank is that it enhances lower formant frequencies which contain spectral information that is more useful to a speech recognizer and smears out differences among different speakers in upper formant frequency so that the same content spoken is perceived similarly regardless of which user spoke it and thus may be more easily recognized.

In the current example, the speaker identification module 114 reverses the filterbank by employing a reversed MFCC filterbank module 204 to extract speaker-dependent information from the speech representation. For example, the reversed MFCC filterbank module 204 may examine upper formant frequencies that typically include speaker-dependent characteristics and hence are beneficial to speaker identification tasks.

The speaker identification module 114, for instance, may sample user utterances at 16 KHz using the microphone. The reversed MFCC filterbank module 204 may start with a traditional Mel-filterbank with a $f_{cutoff} = 8000 - 5000 = 3000$ Hz. This filterbank may be linearly scaled from between 0 to 3000 Hz for high resolution and logarithmically scaled in other frequencies to provide a relatively lower resolution. The filterbank may then be switched (e.g., "flipped") about its center frequency, e.g., $f_{center} = 4000$ Hz. The result is a reversed Mel-filterbank, which scales linearly from 5000 Hz to 8000 Hz, and is logarithmically scaled in the lower frequencies. Thus, the reversed Mel-filterbank enhances resolution for upper formant frequencies which are more informative to speaker identification. The Mel-frequency Cepstral Coefficients obtained from this reversed Mel-filterbank are labeled as rMFCC in the following discussion. Thus, the reversed MFCC filterbank module 204 may utilize higher resolution in the mid-to-upper high frequencies, e.g., from 5000 Hz to a Nyquist frequency at approximately 8000 Hz.

Linear Predictive Coding (LPC) Coefficient Module 206

A simple yet effective model of speech production is a source-filter model in which a combination of a source (e.g., vocal folds) and a linear filter (e.g., vocal tract+radiation characteristics) is used to produce a speech signal. In this section, the first of two techniques is described, in which linear predictive coding (LPC) coefficients are used to model a vocal tract's transfer function as a filter to represent the speech information of a speaker.

As previously described, upper formant frequencies generally contain speaker-dependent information. Roughly speaking, formant frequencies involve resonance of a vocal tract. Hence, the LPC coefficients that model the vocal tract provide a good representation of the formants. Using all-pole autoregressive modeling, the vocal tract's transfer function in the z-domain, H(z) may be represented as the following expression:

$$H(z) = \frac{X(a')}{E(a')} = \frac{1}{1 - \sum_{N=1}^{p} a_k z^{-k}} = \frac{1}{A(z')}, \#$$

where $X(z)$ and $E(z)$ are z-domain representations of the output and excitation signals respectively, p is the LPC order, and $A(z)$ is the inverse filter.

By taking the inverse z-transform and after some algebraic manipulation, the following expression is achieved:

$$e[n] = x[n] - \sum_{k=1}^{p} a_k x[n-k] \#.$$

From this expression, LPC coefficients $a_k$, k=1, ..., p may be computed by minimizing e[n], using an autocorrelation technique. An example of such an autocorrelation technique is described in X. Huang, A. Acero, and H. Hon, *Spoken language processing: a guide to theory, algorithm, and system development*, Prentice Hall, 2001 although it should be readily apparent that other techniques are also contemplated.

Pitch Module 208

In this section, example functionality of the pitch module 208 is described as employing fundamental frequency (F0) techniques, which may be used to indicate a vibration rate of the vocal folds. This may be combined with the linear predictive coding (LPC) coefficients described above which models a vocal tract's transfer function (filter) to represent the speech information of a speaker.

Fundamental frequency (F0) is another speaker-dependent feature which may be used to provide gender and age related information. The effect of fundamental frequency is even more profound in tonal languages, such as Chinese, Thai, and so on because test utterances are typically short, relatively, in gaming applications and fundamental frequencies are extracted from voiced frames of each utterance. In an example, a pitch mean and variation is used but it should be readily apparent that a variety of other techniques may also be employed, such as through modeling a distribution using a Gaussian Mixture Model (GMM). Fundamental frequencies of voiced frames may be estimated using a cepstrum-based technique, an example of which is described by S. Ahmadi and A. S. Spania, "Cepstrum-based pitch detection using a new statistical v/uv classification algorithm," *IEEE Trans. Speech, Audio Process*, vol 7, no. 3, pp. 333-338.

Feature Scoring

The features of the reversed MFCC filterbank module 204, the LPC coefficient module 206, and the pitch module 208 may be combined by the speaker identification module 114 to identify a speaker. For example, scores for the rMFCC and LPC, are standard log-likelihood scores which may be computed as follows:

$$\Gamma(X) = \log p(X | \lambda_{target}) - \log p(X | \lambda_{DBM}) \#,$$

where X is a feature vector, $p(X|\lambda)$ is the likelihood of feature vector X belonging to the GMM$\lambda$.

The fundamental frequency score may be defined according to the following expression:

$$H(F0_n) \equiv \max(P_{voiced} \times |F0_{target} - F0_n|) - P_{voiced} \times |F0_{target} - F0_x|_1$$

where $P_{voiced}$ is the probability of voiced frames in the test utterance as follows:

$$P_{voiced} = \frac{\text{No. voiced frames}}{\text{Total no. frames}} \#.$$

Note that fundamental frequency score is weighted by the probability of voiced frames because the fundamental frequencies were estimated from the voiced frames, alone. Also, the weighted score is subtracted from the maximum value over each of the genuine speakers so that the better match between $FO_x$ and $FO_{target}$, the larger the score. In this way, the fundamental frequency score varies coherently with the log-likelihood scores of the first two features.

Next, the speaker identification module 114 may assign weights to the feature scores so that the resulting final score minimizes the error rate. The final score of a given test utterance "u" may be defined as follows:

$$\mathcal{S}(u) = \hat{w}_1 \Gamma(rMFCC) + \hat{w}_2 \Gamma(LPC) + w_3 H(FO)._{\#}$$

The optimization criterion for the weight vector W={$w_1$, $w_2$, $w_3$} may be expressed as follows:

$$\hat{W} = \underset{W}{\text{argmin}} \left( \frac{\sqrt{FRR^2 + FAR^2}}{2} \right) \#,$$

where FRR and FAR are the false rejection rate and false acceptance rate, respectively. The optimized "W" may be obtained from a training set using Gaussian optimization techniques and criterion of minimizing the equal error rate, which may then be applied to final scores of a test set, which may be output for use by a variety of applications, such as to login or play a game 210.

Thus, speaker identification techniques have been described that are suitable for conventional scenarios such as telephone audio as well as unconventional scenarios such as those involved in a gaming environment. Speaker identification may be performed using a variety of techniques, such as reversed MFCC, LPC, and F0 to extract speaker-dependent information from speech signals received from a microphone 202. Further, these techniques may be combined with other identification techniques such as biometrics, face detection using the camera of the NUI input device 110, and so on to further help identify a particular user.

Example Procedures

The following discussion describes speaker identification techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
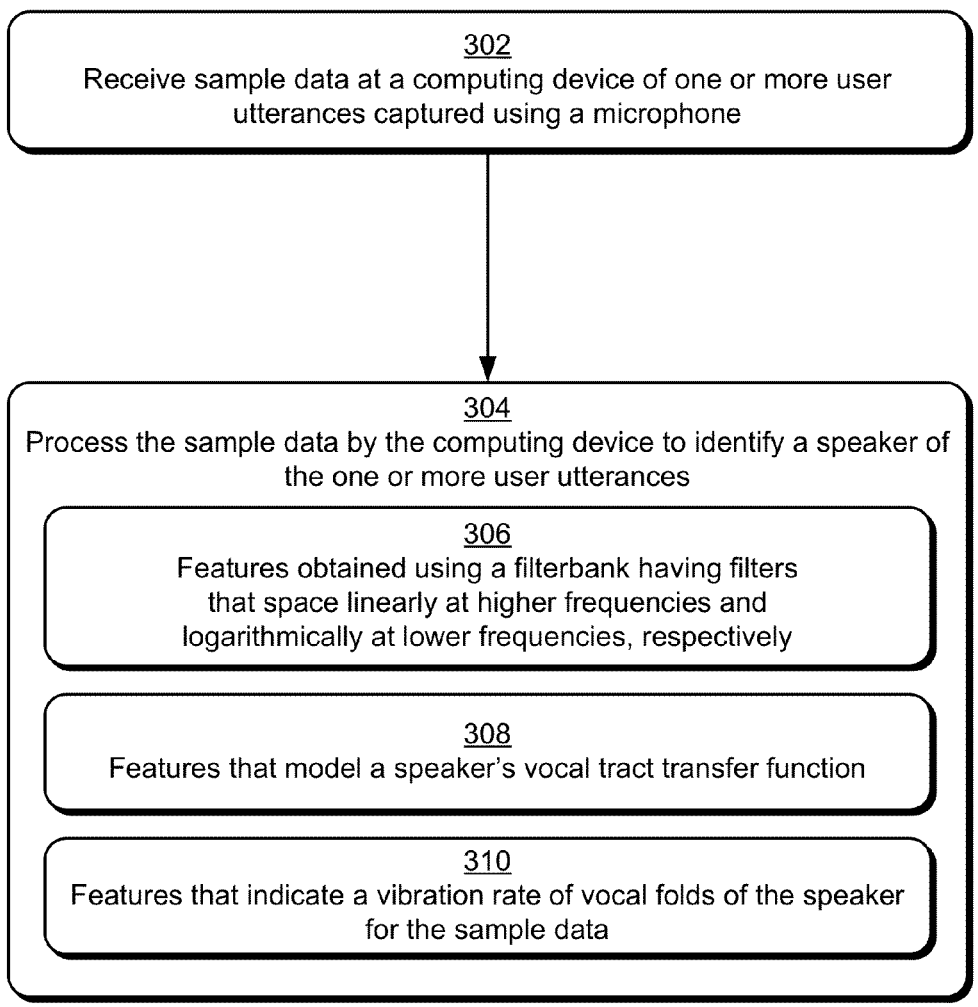
FIG. 3 is a flow diagram depicting a procedure in an example implementation in which sample data is processed to locate features that are usable to identify a speaker of the sample data.

FIG. 3 depicts a procedure 300 in an example implementation in which sample data is processed to locate features that are usable to identify a speaker of the sample data. Sample data is received at a computing device of one or more user utterances captured using a microphone (block 302). The computing device 102, for instance, may employ a microphone 202 configured in a variety of ways. The microphone 202, for instance, may be included as part of a mobile communication device such as a telephone. The microphone 202 may also be configured as a four-channel array microphone as may be found in a game console implementation.

The sample data is processed by the computing device to identify a speaker of the one or more user utterances (304). In this way, the computing device 102 may identify "who" provided a user utterance in the sample data. To perform this identification, the speaker identification module 114 may leverage a variety of features.

For example, the processing may involve use of a feature set that includes features obtained using a filterbank having filters that space linearly at higher frequencies and logarithmically at lower frequencies, respectively (block 306). As previously described in relation to FIG. 2, for instance, the speaker identification module 114 may employ a reversed MFCC filterbank module 204 to enhance frequencies in the sample data that include speaker-dependent information.

Additionally, the processing may involve use of features that model the speaker's vocal tract transfer function (block 308). Again as previously described, the speaker identification module 114 may leverage an LPC coefficient module 206 that is representative of functionality to generate linear predictive coding coefficients.

Further, the processing may involve use of features that indicate a vibration rate of vocal folds of the speaker of the sample data (block 310). For example, a pitch module 208 may be employed by the speaker identification module 114 to locate features that are indicative of an age and gender of the speaker. A variety of other features are also contemplated without departing from the spirit and scope thereof.

Figure 4:
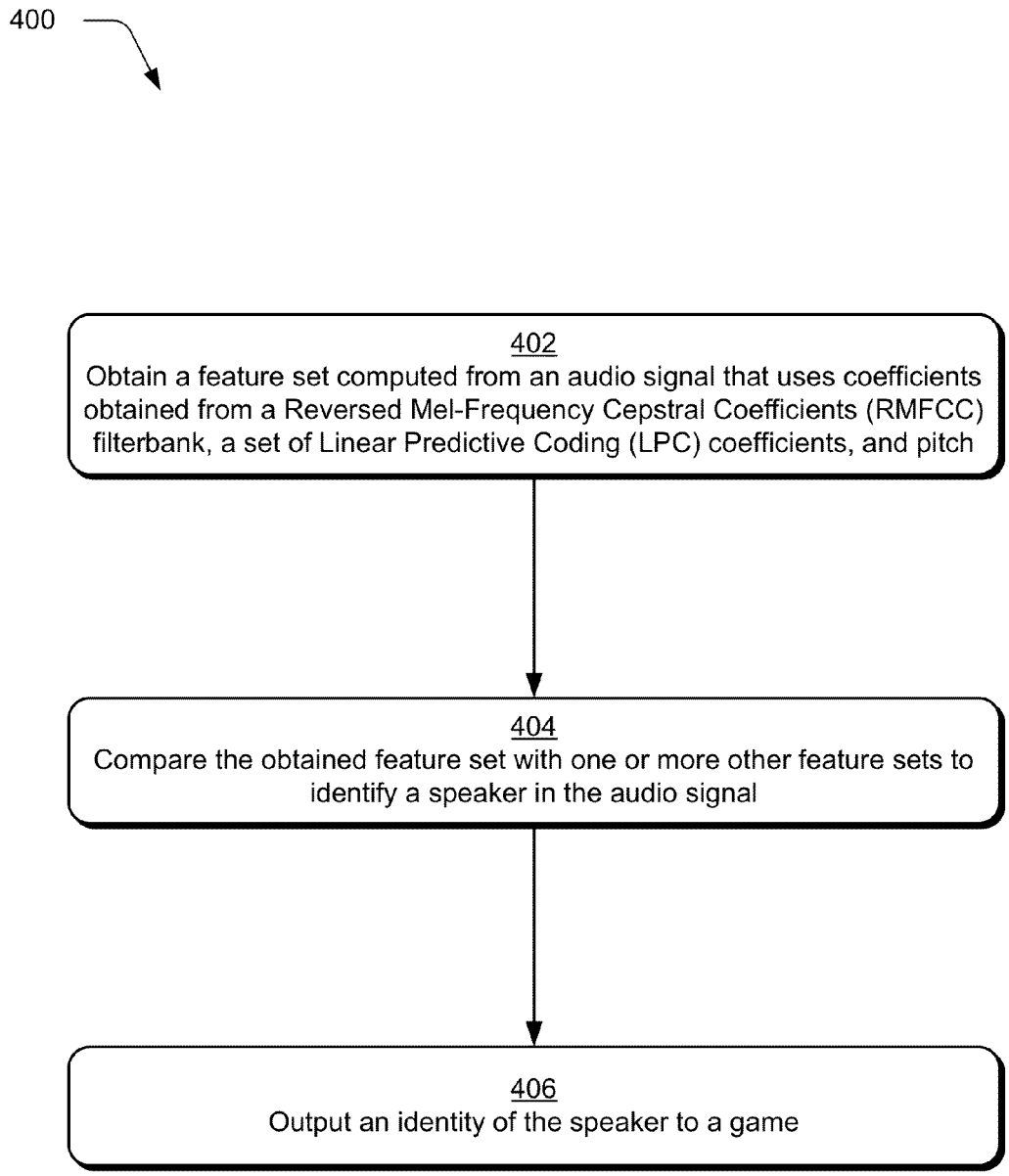
FIG. 4 is a flow diagram depicting a procedure in an example implementation in which a speaker is identified and a result of which is output to a game for use by the game.

FIG. 4 depicts a procedure 400 in an example implementation in which a speaker is identified and a result of which is output to a game for use by the game. A feature set is computed from an audio signal is obtained that uses coefficients obtained from a Reversed Mel-Frequency Cepstral Coefficients (RMFCC) Interbank, a set of Linear Predictive Coding (LPC) coefficients, and pitch (block 402). As before, the speaker identification module 114 may employ a reversed MFCC filterbank module 204, an LPC coefficient module 206, and a pitch module 208 to implement this functionality.

The obtained feature set is compared with one or more other feature sets to identify a speaker in the audio signal (block 404). The computing device 102, for instance, may include a plurality of saved feature sets that model characteristics of corresponding speakers. These speakers may be identified such that if the obtained feature set corresponds to one of the saved feature sets, an identify that corresponds to the saved feature set is also considered to be the identity of a speaker of the obtained feature set. This identity may be used in a variety of ways.

For example, the identity of the speaker may be output to a game (block 406), such as to login a user to the game, for use "within" the game (e.g., to identify which contestant spoke in a trivia video game), and so forth. A variety of other uses are also contemplated, such as to speed speech recognition processing as previously described.

Example System and Device

Figure 5:
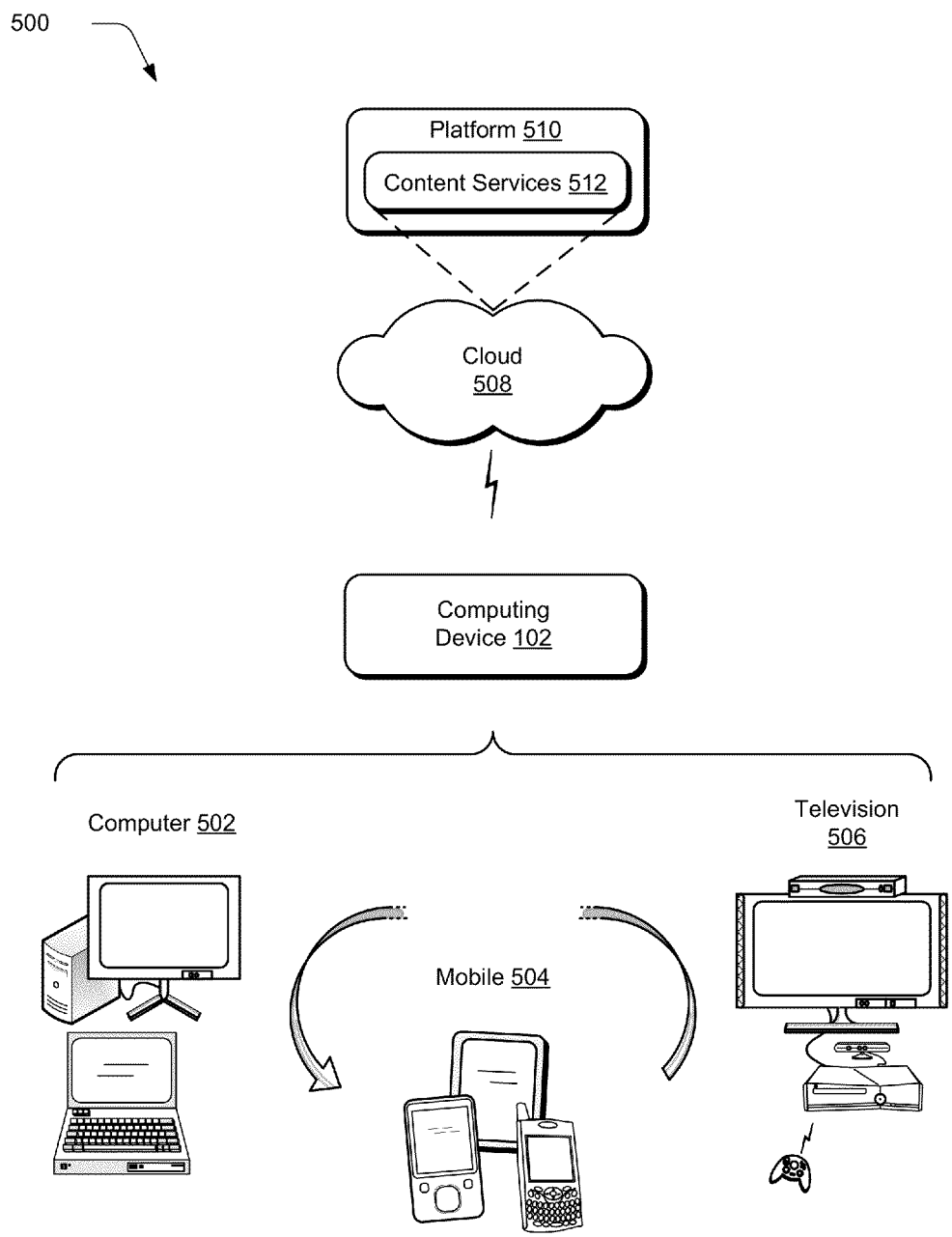
FIG. 5 illustrates an example system that includes the computing device as described with reference to FIG. 1.

FIG. 5 illustrates an example system 500 that includes the computing device 102 as described with reference to FIG. 1. The example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 502, mobile 504, and television 506 uses. Each of these configurations includes devices that may have generally different constructs and capabilities, and thus the computing device 102 may be configured according to one or more of the different device classes. For instance, the computing device 102 may be implemented as the computer 502 class of a device that includes a personal computer, desktop computer, a multi-screen computer, laptop computer, netbook, and so on.

The computing device 102 may also be implemented as the mobile 502 class of device that includes mobile devices, such as a mobile phone, portable music player, portable gaming device, a tablet computer, a multi-screen computer, and so on. The computing device 102 may also be implemented as the television 506 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 508 includes and/or is representative of a platform 510 for content services 512. The platform 510 abstracts underlying functionality of hardware (e.g., servers) and software resources of the cloud 508. The content services 512 may include applications and/or data that can be utilized while computer processing is executed on servers that are remote from the computing device 102. Content services 512 can be provided as a service over the Internet and/or through a subscriber network, such as a cellular or Wi-Fi network.

The platform 510 may abstract resources and functions to connect the computing device 102 with other computing devices. The platform 510 may also serve to abstract scaling of resources to provide a corresponding level of scale to encountered demand for the content services 512 that are implemented via the platform 510. Accordingly, in an interconnected device embodiment, implementation of functionality of the functionality described herein may be distributed throughout the system 500. For example, the functionality may be implemented in part on the computing device 102 as well as via the platform 510 that abstracts the functionality of the cloud 508.

Figure 6:
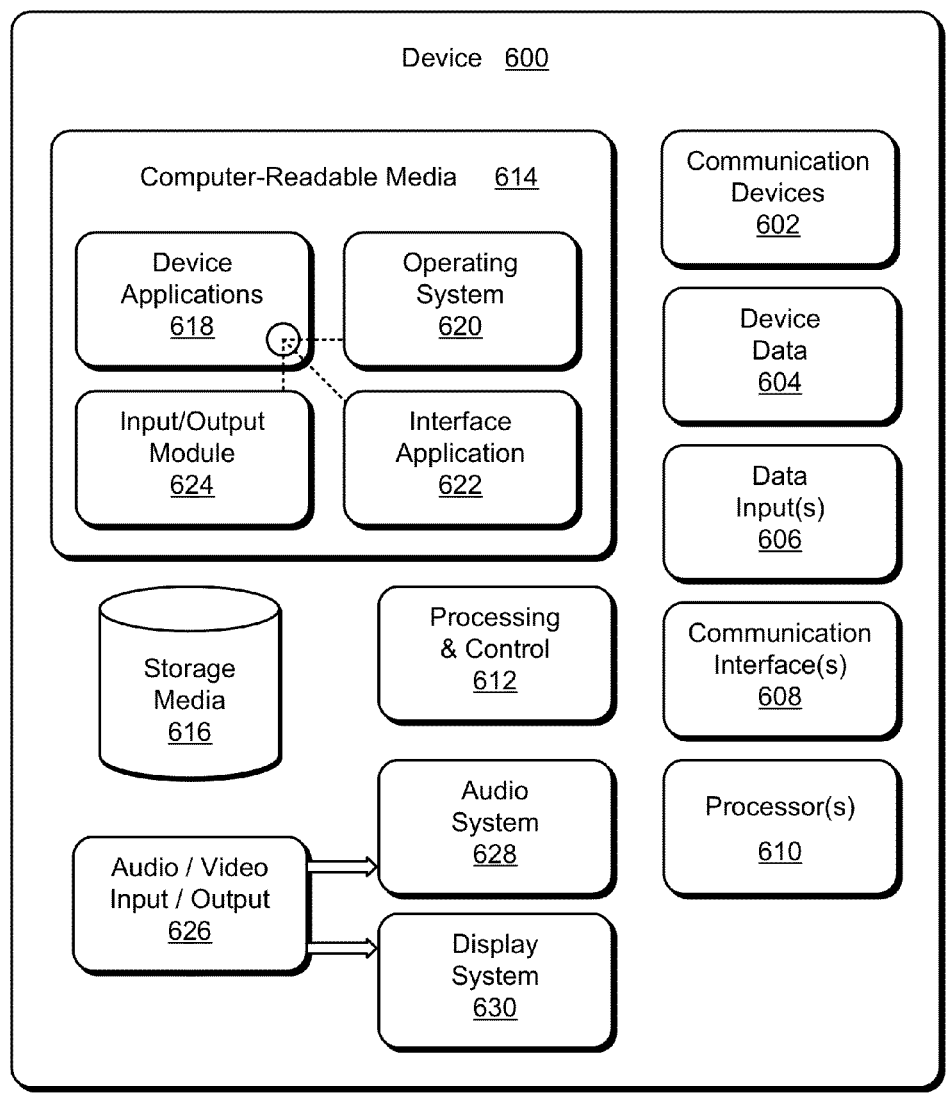
FIG. 6 illustrates various components of an example device that can be implemented as any type of computing device as described with reference to FIGS. 1, 2, and 5 to implement embodiments of the techniques described herein.

FIG. 6 illustrates various components of an example device 600 that can be implemented as any type of computing device as described with reference to FIGS. 1, 2, and 5 to implement embodiments of the techniques described herein. Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable instructions to control the operation of device 600 and to implement embodiments of the techniques described herein. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.). The device applications 618 also include any system components or modules to implement embodiments of the gesture techniques described herein. In this example, the device applications 618 include an interface application 622 and an input/output module 624 (which may be the same or different as input/output module 114) that are shown as software modules and/or computer applications. The input/output module 624 is representative of software that is used to provide an interface with a device configured to capture inputs, such as a touchscreen, track pad, camera, microphone, and so on. Alternatively or in addition, the interface application 622 and the input/output module 624 can be implemented as hardware, software, firmware, or any combination thereof. Additionally, the input/output module 624 may be configured to support multiple input devices, such as separate devices to capture visual and audio inputs, respectively.

Device 600 also includes an audio and/or video input-output system 626 that provides audio data to an audio system 628 and/or provides video data to a display system 630. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

CONCLUSION

Although the invention has been described in language specific to structural features and/or methodological acts, it is to be understood, that the invention defined in the appended claims is not necessarily limited to the specific features or acts described. Rather, the specific features and acts are disclosed as example forms of implementing the claimed invention.

What is claimed is:

1. A method comprising:
   receiving sample data at a computing device of one or more user utterances captured using a microphone; and
   processing the sample data by the computing device to identify a speaker of the one or more user utterances, the processing involving use of a feature set that includes:
   features obtained using a filterbank having filters that space linearly at higher frequencies and logarithmically at lower frequencies, respectively;

features that model the speaker's vocal tract transfer function; and
features that indicate a vibration rate of vocal folds of the speaker for the sample data.

2. A method as described in claim 1, wherein the features are obtained from the filterbank through use of reversed Mel-Frequency Cepstral Coefficients (RMFCC).

3. A method as described in claim 1, wherein the spacing of the filters linearly at the higher frequencies and logarithmically at the lower frequencies, respectively, enhances resolution for upper formant frequencies that are more informative to speaker identification over that of lower formant frequencies of the sample data.

4. A method as described in claim 1, wherein the features that model the speaker's vocal tract transfer function are computed using Linear Predictive Coding (LPC).

5. A method as described in claim 1, wherein the features that indicate the vibration rate of vocal folds of the speaker are computed using Fundamental Frequency (F0).

6. A method as described in claim 1, wherein the features that indicate the vibration rate of vocal folds of the speaker of the sample data are indicative of a gender or age of the speaker.

7. A method as described in claim 1, wherein:
the features are obtained from the filterbank through use of reversed Mel-Frequency Cepstral Coefficients (RMFCC);
the features that model the speaker's vocal tract transfer function are computed using Linear Predictive Coding (LPC); and
the features that indicate the vibration rate of vocal folds of the source of the sample data are computed using Fundamental Frequency (F0).

8. A method as described in claim 7, further comprising calculating a score from the feature set that includes features obtained from the filterbank, the features that model the speaker's vocal tract transfer function, and the features that indicate the vibration rate.

9. A method as described in claim 8, wherein the calculating includes assigning weights to the features of the feature set to minimize an error rate.

10. A method as described in claim 8, wherein the calculating includes assigning weights to the features of the feature set using a weight vector W computed according to the following expression:

$$\hat{W} = \underset{W}{\text{argmin}}\left(\frac{\sqrt{FRR^2 + FAR^2}}{2}\right)\#,$$

where FRR and FAR are the false rejection rate and false acceptance rate, respectively.

11. A method as described in claim 1, wherein the processing includes use of image data to verify the identification of the speaker, the image data captured from a camera of a physical environment of the computing device.

12. A method implemented by a computing device, the method comprising:
obtaining a feature set computed from an audio signal that uses coefficients obtained from a Reversed Mel-Frequency Cepstral Coefficients (RMFCC) filterbank having filters that space linearly at higher frequencies and logarithmically at lower frequencies, respectively, a set of Linear Predictive Coding (LPC) coefficients, and pitch; and
comparing the obtained feature set with one or more other feature sets to identify a speaker in the audio signal.

13. A method as described in claim 12, wherein the obtained feature set includes a score calculated from a weighting of scores from respective coefficients obtained from the Reversed Mel-Frequency Cepstral Coefficients (RMFCC) filterbank, the set of Linear Predictive Coding (LPC) coefficients, and the pitch.

14. A method as described in claim 12, wherein the weighting employs a weight vector W computed according to the following expression:

$$\hat{W} = \underset{W}{\text{argmin}}\left(\frac{\sqrt{FRR^2 + FAR^2}}{2}\right)\#,$$

where FRR and FAR are a false rejection rate and false acceptance rate, respectively.

15. An apparatus comprising:
a microphone; and
a speaker identification module configured to identify a speaker from an audio signal obtained from the microphone by:
modeling a vocal tract and vocal cords of the speaker by processing the audio signal using a filterbank having filters that space linearly at higher frequencies and logarithmically at lower frequencies, respectively; and
comparing the model processed from the audio signal with one or more other models that correspond to an identity to determine which identity corresponds to the speaker; and
outputting the identity to a game that is executed on hardware of the apparatus.

16. An apparatus as described in claim 15, wherein the modeling uses coefficients obtained from a Reversed Mel-Frequency Cepstral Coefficients (RMFCC) filterbank.

17. An apparatus as described in claim 15, wherein the modeling uses a set of Linear Predictive Coding (LPC) coefficients.

18. An apparatus as described in claim 15, wherein the modeling uses pitch.

19. An apparatus as described in claim 15, wherein the modeling employs a weight vector W for features in the model, the weight vector computed according to the following expression:

$$\hat{W} = \underset{W}{\text{argmin}}\left(\frac{\sqrt{FRR^2 + FAR^2}}{2}\right)\#,$$

where FRR and FAR are a false rejection rate and false acceptance rate, respectively.

20. An apparatus as described in claim 15, further comprising a speech recognition module that is configured to recognize speech from the audio signal and leverage the identity of the speaker.

* * * * *